（12） United States Patent
Ma et al.

(10) Patent No.: US 12,156,258 B2
(45) Date of Patent: Nov. 26, 2024

(54) RANDOM ACCESS METHOD AND DEVICE

(71) Applicant: VIVO MOBILE COMMUNICATION CO., LTD., Guangdong (CN)

(72) Inventors: Yue Ma, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 666 days.

(21) Appl. No.: 17/385,078

(22) Filed: Jul. 26, 2021

(65) Prior Publication Data

US 2021/0352744 A1    Nov. 11, 2021

Related U.S. Application Data

(63) Continuation of application No. PCT/CN2020/073837, filed on Jan. 22, 2020.

(30) Foreign Application Priority Data

Jan. 30, 2019    (CN) .......................... 201910094318.3

(51) Int. Cl.
*H04W 72/23* (2023.01)
*H04W 74/00* (2009.01)
*H04W 74/0833* (2024.01)

(52) U.S. Cl.
CPC ....... *H04W 74/0841* (2013.01); *H04W 72/23* (2023.01); *H04W 74/004* (2013.01)

(58) Field of Classification Search
CPC ............. H04W 72/1268; H04W 72/23; H04W 74/004; H04W 74/0841

(Continued)

(56) References Cited

U.S. PATENT DOCUMENTS 11,917,687 B2 * 2/2024 Sahlin .................. H04W 16/28
2018/0270722 A1   9/2018 Kim et al.
(Continued)

FOREIGN PATENT DOCUMENTS

CN    108141856 A    6/2018
CN    108282899 A    7/2018
(Continued)

OTHER PUBLICATIONS

LG Electronics Inc., "2-Step RACH procedure for NR-U," 3GPP TSG-RAN WG2 #103bis, R2-1818098, Spokane, USA Nov. 12-16, 2018 (4 pages).

(Continued)

*Primary Examiner* — Joseph Arevalo
(74) *Attorney, Agent, or Firm* — Price Heneveld LLP

(57) ABSTRACT

Embodiments of this disclosure provide a random access method and a device, and relate to the field of communications technologies, to resolve the problem of random access failure existing in the related art. The method includes: initiating second random access after first random access fails, where first uplink data in the first random access and second uplink data in the second random access are the same in data size, the first uplink data is uplink data corresponding to a first resource for the first random access, the second uplink data is uplink data corresponding to a second resource for the first random access, the first random access includes two-step random access or four-step random access, and the second random access includes two-step random access or four-step random access.

15 Claims, 4 Drawing Sheets

(58) Field of Classification Search
USPC .................. 370/329, 503, 336, 343, 331
See application file for complete search history.

(56) References Cited

U.S. PATENT DOCUMENTS

| | | |
|---|---|---|
| 2018/0279186 A1 | 9/2018 | Park et al. |
| 2019/0215896 A1* | 7/2019 | Zhou ................... H04L 1/0027 |
| 2019/0223224 A1* | 7/2019 | Park ................... H04W 74/006 |
| 2019/0254074 A1* | 8/2019 | Jeon ................ H04W 74/0833 |
| 2019/0350004 A1 | 11/2019 | Zhao et al. |
| 2019/0380071 A1 | 12/2019 | Liu |
| 2020/0045650 A1* | 2/2020 | Suzuki ................. H04W 52/36 |
| 2020/0107369 A1* | 4/2020 | Jeon ................... H04W 74/006 |
| 2020/0221504 A1* | 7/2020 | Cirik ................... H04L 1/1822 |
| 2020/0236648 A1* | 7/2020 | Park ...................... H04W 76/27 |
| 2021/0167839 A1* | 6/2021 | Zhang ................. H04W 76/19 |
| 2021/0289536 A1* | 9/2021 | Liu ................... H04W 74/0841 |
| 2021/0345422 A1 | 11/2021 | Chen |
| 2022/0061101 A1* | 2/2022 | Wu ....................... H04L 5/0053 |
| 2022/0085862 A1* | 3/2022 | Kung .................... H04B 7/024 |
| 2023/0353220 A1* | 11/2023 | Cirik .................... H04W 24/08 |

FOREIGN PATENT DOCUMENTS

| | | |
|---|---|---|
| CN | 111277382 A | 6/2020 |
| WO | 2018064367 A1 | 4/2018 |
| WO | 2018157298 A1 | 9/2018 |
| WO | 2018204863 A1 | 11/2018 |

OTHER PUBLICATIONS

Nokia, "Msg3 handling when switching from CBRA to CFRA," 3GPP TSG-RAN WG2 Meeting NR Adhoc 1807, R2-1810157, Montreal, Canada, Jul. 2-6, 2018 (4 pages).

LG Electronics, "RACH procedure," 3GPP TSG RAN WG1 Meeting #90bis, R1-1717931, Prague, CZ, Oct. 9-13, 2017 (7 pages).

Vivo, "RAN2 impacts of 2-step RACH," 3GPP TSG-RAN WG2 Meeting #104, R2-1818260, Spokane USA Nov. 12-16, 2018 (5 pages).

* cited by examiner

RANDOM ACCESS METHOD AND DEVICE

This application is a continuation application of International Application No. PCT/CN2020/073837 filed on Jan. 22, 2020, which claims priority to Chinese Patent Application No. 201910094318.3, filed with China National Intellectual Property Administration on Jan. 30, 2019 and entitled "RANDOM ACCESS METHOD AND DEVICE", both disclosures of which are incorporated herein by reference in their entireties.

TECHNICAL FIELD

Embodiments of this disclosure relate to the field of communications technologies, and in particular, to a random access method and a device.

BACKGROUND

Currently, there are mainly two types of random access procedures: One is four-step random access (4-step RACH), and the other one is two-step random access (2-step RACH). In the related art, when a terminal device accesses a network by using 2-step RACH/4-step RACH, it may happen that the access fails, is unsuccessful, or is not completed, and in this case, the terminal device is required to initiate another access procedure.

However, during the previous random access procedure, the terminal device has already completed a medium access control (MAC) protocol data unit (PDU) encapsulation process according to the size of a common control channel (CCCH)/uplink data (UL data). In a case that uplink grant information (UL grant)/an uplink data shared channel (PUSCH) size changes in the new random access, the terminal device is required to perform a new MAC PDU encapsulation process, thereby leading to a random access failure.

SUMMARY

According to a first aspect, an embodiment of this disclosure provides a random access method, applied to a terminal device, where the method includes:

initiating second random access after first random access fails, where first uplink data in the first random access and second uplink data in the second random access are the same in data size, the first uplink data is uplink data corresponding to a first resource for the first random access, the second uplink data is uplink data corresponding to a second resource for the first random access, the first random access includes two-step random access or four-step random access, and the second random access includes two-step random access or four-step random access.

According to a second aspect, an embodiment of this disclosure provides a random access method, applied to a network device, where the method includes:

transmitting configuration information to a terminal device, where the configuration information includes at least one of the following: a correspondence between M PRACH preamble sets and N third resources, or a correspondence between the N third resources and X PUSCHs; and one third resource includes at least one of the following: a PRACH preamble or a RO, one PRACH preamble set corresponds to at least one third resource, one PUSCH corresponds to at least one third resource, M is an integer greater than 1, and N and X are positive integers.

According to a third aspect, an embodiment of this disclosure provides a terminal device, including:

an execution module, configured to initiate second random access after first random access fails, where first uplink data in the first random access and second uplink data in the second random access are the same in data size, the first uplink data is uplink data corresponding to a first resource for the first random access, the second uplink data is uplink data corresponding to a second resource for the first random access, the first random access includes two-step random access or four-step random access, and the second random access includes two-step random access or four-step random access.

According to a fourth aspect, an embodiment of this disclosure provides a network device, including:

a transmitting module, configured to transmit configuration information to a terminal device, where the configuration information includes at least one of the following: a correspondence between M PRACH preamble sets and N third resources, or a correspondence between the N third resources and X PUSCHs; and one third resource includes at least one of the following: a PRACH preamble or a RO, one PRACH preamble set corresponds to at least one third resource, one PUSCH corresponds to at least one third resource, M is an integer greater than 1, and N and X are positive integers.

According to a fifth aspect, an embodiment of this disclosure provides a terminal device, including a processor, a memory, and a computer program stored in the memory and capable of running on the processor, where when the computer program is executed by the processor, the steps of the random access method according to the first aspect are implemented.

According to a sixth aspect, an embodiment of this disclosure provides a network device, including a processor, a memory, and a computer program stored in the memory and capable of running on the processor, where when the computer program is executed by the processor, the steps of the random access method according to the second aspect are implemented.

According to a seventh aspect, an embodiment of this disclosure provides a computer-readable storage medium, where the computer-readable storage medium stores a computer program, and when the computer program is executed by a processor, the steps of the foregoing random access method are implemented.

DESCRIPTION OF EMBODIMENTS

Figure 1:
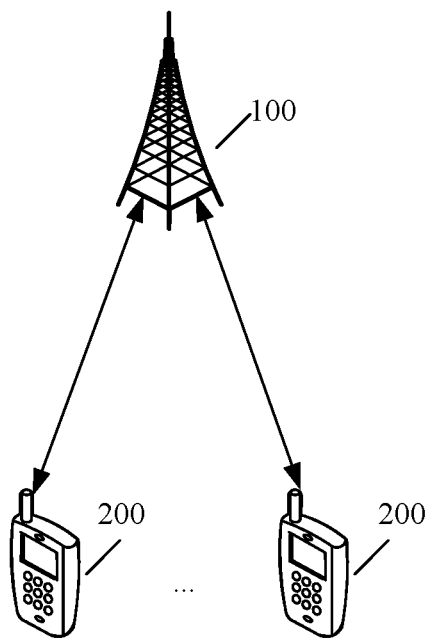
FIG. 1 is a possible schematic structural diagram of a communications system involved in an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of the embodiments of this disclosure.

For ease of understanding, the following describes some of the terms involved in the embodiments of this disclosure.

1. Four-Step Random Access (4-Step RACH)

The 4-step RACH (that is, a normal RACH procedure in the related art) generally includes the following five steps.

Step 11: A terminal device transmits a Msg1 (a random access preamble) to a network device.

Step 12: After receiving the Msg1, the network device may transmit a Msg2 to the terminal device. The Msg2 is a random access response (RAR) message. The RAR is scrambled by using a random access radio network temporary identity (RA-RNTI), and includes a backoff indicator (BI), an uplink grant (UL grant), a random access preamble identification (RAPID), a temporary cell radio network temporary identity (TC-RNTI), or the like.

Step 13: The terminal device that detects a RAPID corresponding to a preamble transmitted by the terminal device itself transmits a Msg3 based on the location of the UL grant (a terminal device that has not detected a RAPID transmitted by the terminal device itself uses a BI to delay access).

Step 14: The terminal device receives a Msg4 transmitted from a network side, the Msg4 including a contention-resolution ID, and upgrades the TC-RNTI to a cell radio network temporary identity (C-RNTI), and later the network side may use the C-RNTI to schedule the terminal device.

Step 15: Generally, the terminal device is required to transmit a Msg5, that is, an access complete message.

It should be noted that the general four-step access mainly refers to a procedure of completing contention resolution in first four steps, and the first four steps generally represent a conventional radio network random access procedure.

Further, for four-step random access (4-step RACH), a random access procedure by the terminal device includes:

A. a contention-based random access procedure; and

B. a contention-free random access procedure.

For "a contention-based random access procedure", the terminal device transmits a Msg1 to the network device, that is, the terminal device transmits a random access request to the network device. After receiving the Msg1, the network device transmits a Msg2 to the terminal device, that is, the network device transmits to the terminal device a RAR message in which UL grant information is carried. The terminal device executes a medium access control (MAC) layer encapsulation function to generate a MAC protocol data unit (PDU) according to the UL grant in a Msg2, and stores the MAC PDU in a Msg3 buffer. Then the terminal device transmits the MAC PDU in the Msg3 buffer through a hybrid automatic repeat request (HARM) process. After receiving the Msg3, the network device transmits a Msg4 (for example, a contention-resolution ID) to the terminal device. The terminal device receives the Msg4, and determines whether contention is successfully resolved. If the contention is successfully resolved, the random access procedure succeeds; otherwise, the terminal device re-initiates a random access procedure. For the re-initiated random access procedure, after receiving a UL grant in a Msg2 again, the terminal device takes the previously stored MAC PDU directly from the Msg3 buffer for transmission through a HARQ process. After the random access procedure is complete, the terminal device clears a HARQ buffer used for Msg3 transmission in the random access procedure.

For "a contention-free random access procedure", the terminal device transmits a Msg1 to the network device, that is, the terminal device transmits a random access request to the network device. After receiving the Msg1, the network device transmits a Msg2 to the terminal device, that is, the network device transmits to the terminal device a RAR message in which UL grant information and identity information (for example, a random access preamble number of the Msg1) of the terminal device are carried. If the random access preamble number is the same as a random access preamble number carried in the Msg1 of the terminal device, the terminal device considers that the random access procedure succeeds; otherwise, the terminal device re-initiates a random access procedure.

Every time the terminal device initiates (or re-initiates) a random access procedure, the terminal device selects a random access resource based on downlink signal quality (for example, reference symbol received power (RSRP) of a synchronization signal block (SSB)) corresponding to a Msg1 resource in each random access procedure, to increase a random access success rate. Therefore, every time the terminal device initiates (or re-initiates) a random access procedure, the terminal device may select the "contention-based random access procedure" or the "contention-free random access procedure".

2. Two-Step Random Access (2-Step RACH)

A 2-step RACH specifically includes the following two steps.

Step 21: UE triggers a 2-step RACH procedure to transmit request information (MsgA) to a network device, for example, to transmit through PUSCH+preamble.

Step 22: A network side transmits acknowledgment information (MsgB) to the UE.

If the UE fails to receive the MsgB (which means a RAPID corresponding to the MsgA transmitted by the UE itself is not received or no contention-resolution ID is received), the UE retransmits a Msg1 (or may retransmit the MsgA, Msg3 or Msg1, depending on the specific scheme).

Generally, before the step 21, the network device may configure two-step random access configuration information for the UE. For example, the configuration information includes: transmission resource information corresponding to MsgA and MsgB.

Conventionally, for ease of understanding, MsgA in the 2-step procedure includes Msg1 and Msg3 in a 4-step procedure, and MsgB in the 2-step procedure includes Msg2 and Msg4 in the 4-step procedure. Moreover, before the step 21 is performed, the network device may configure 2-step RACH configuration information for the UE, for example, transmission resource information corresponding to MsgA and MsgB.

3. Preamble Grouping

Due to uplink coverage requirements, in LTE and NR, preamble sequences (for example, each cell has 64 available preamble sequences) are grouped. Generally, the available preamble sequences may be divided into two groups, namely, group A and group B.

The group A and group B correspond to different uplink transport block sizes:

For CCCH transmission, if the uplink transport block size corresponding to the group A is exceeded, a preamble in the group B is used in the random access procedure. For uplink data transmission carried in other Msg3, if the uplink transport block size corresponding to the group A is exceeded, and a measured uplink path loss is less than a given calculated value, a preamble in the group B is used; otherwise, a preamble in the group A is used. After receiving different preamble groups, the network side may assign different uplink UL grants to the UE based on a difference between the group A and the group B (the group A and the group B each correspond to a minimum grant value configured by the network side).

Certainly, the foregoing grouping names of group A and group B are just an example, and other grouping names based on the amount of uplink data carried and having similar meaning also fall within the protection scope of the embodiments of this disclosure.

4. First Random Access and Second Random Access

The first random access herein includes two-step random access or four-step random access, and the second random access herein includes two-step random access or four-step random access. The first random access and the second random access refer to a same access procedure, where the same access procedure refers to a fact that next random access is initiated immediately (which may start from Msg1/MsgA or from fallback to Msg3) after triggered random access fails, is not completed or not successful. In other words, the two or more times of random accesses have a same purpose, and are triggered by same or similar trigger conditions.

The foregoing procedure of triggering fallback from two-step random access directly to four-step random access may be explicitly triggering by an indication carried in the MsgB transmitted by the network side, or implicitly obtaining the triggering from other content carried in the MsgB through comprehensive judgment by the terminal device. For example, the MsgB includes a RAPID corresponding to a preamble transmitted by the terminal, corresponding UL grant, an indication indicating that no contention-resolution ID is obtained by the terminal device, or the like.

5. First Random Access Failure

The random access method provided herein is mainly applied to a scenario in which the first random access fails. In the embodiments of this disclosure, the first random access failure includes at least one of the following: the first random access is not completed, the first random access is not successfully completed, or the first random access is problematic.

Specifically, a failed random access procedure may include an uncompleted random access procedure and an unsuccessful random access procedure. The failure may be caused by a variety of factors, such as: a transmit power (including power of the preamble sequence and/or power of the PUSCH) after power ramping exceeds a maximum power; the number of times Msg1/MsgA is transmitted exceeds a preset maximum value; Msg2 or MsgB or Msg4 (contention-resolution ID) is not received after timeout.

Generally, completed random access specifically may also include: successfully completed random access and unsuccessfully completed random access. Therefore, the unsuccessfully completed random access is also failed random access.

In addition, problematic random access may also be considered as random access that is not successfully completed, which means problematic random access also falls within the protection scope of the embodiments of this disclosure.

6. Other Terms

"/" herein represents or, for example, AB may represent A or B. The term "and/or" herein describes only an association relationship for describing associated objects and represents that three relationships may exist, for example, A and/or B may represent the following three cases: Only A exists, both A and B exist, and only B exists.

For ease of clear description of the technical solutions of the embodiments of this application, in the embodiments of this application, the words "first", "second", and the like are used to distinguish the same items or similar items having substantially the same functions or roles, and those skilled in the art can understand that the words "first", "second", and the like do not constitute any limitation on a quantity and an execution order. For example, first uplink data and second uplink data are used to distinguish between different uplink data, but do not indicate a particular order of the uplink data.

Terms herein such as "example" or "for example" are used to represent an example, an instance, or an illustration. Any embodiment or design solution described as "an example" or "for example" in the embodiments of this disclosure should not be construed as being more preferred or advantageous than other embodiments or design solutions. To be precise, the terms such as "example" or "for example" are intended to present a related concept in a specific manner. "Of", "corresponding or relevant", and "corresponding" herein may be interchangeably used sometimes. It should be noted that expressed meanings are consistent when differences are not emphasized.

"A plurality of" herein means at least two.

In combination with the foregoing content, the following describes solutions provided herein with reference to the accompanying drawings.

The technical solutions provided in the embodiments of this disclosure may be applied to various communications systems, such as a 5G communications system, a future evolved system or a plurality of communication fusion systems. A plurality of application scenarios may be included, such as machine to machine (M2M), D2M, macro-micro communications, enhanced mobile Internet (eMBB), ultra reliable and low latency communications (uRLLC), and massive machine type communications (mMTC). These scenarios include, but are not limited to, scenarios such as communication between terminal devices, communication between network devices, or communication between a network device and a terminal device. The embodiments of this disclosure may be applied to communication between a network device and a terminal device, or communication between terminal devices, or communication between network devices in a 5G communications system.

FIG. 1 is a possible schematic structural diagram of a communications system in an embodiment of this disclosure. As shown in FIG. 1, the communications system includes at least one network device 100 (only one is shown in FIG. 1) and one or more terminal devices 200 to which each network device 100 is connected.

The network device 100 may be a base station, a core network device, a transmission and reception point (TRP), a relay station, an access point, or the like. The network device 100 may be a base transceiver station (BTS) in a global system for mobile communications (GSM) or a code division multiple access (CDMA) system, may be an NB (NodeB) in a wideband code division multiple access (WCDMA) system, or may be an eNB or eNodeB (evolved NodeB) in LTE. The network device 100 may alternatively be a wireless controller in a cloud radio access network (CRAN) scenario. The network device 100 may alternatively be a network device in a 5G communications system or a network device in a future evolved network. However, the terms do not constitute a limitation on the protection scope of the embodiments of this disclosure.

The terminal device 200 may be a wireless terminal device or may be a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, or a terminal device in a future evolved PLMN network, or the like. The wireless terminal device may communicate with one or more core networks via a radio access network (RAN). The wireless terminal device may be a mobile terminal device such as a mobile phone (or referred to as "cellular" phone) and a computer having a mobile terminal device, such as a portable, pocket-sized, handheld, computer built-in, or in-vehicle mobile apparatus, which exchanges voice and/or data with the radio access network; or may be a device such as a personal communication service (PCS) phone, a cordless phone, a session initiation protocol (SIP) phone, a wireless local loop (WLL) station, or a personal digital assistant (PDA). The wireless terminal device may also be a mobile device, user equipment (UE), a UE terminal device, an access terminal device, a wireless communication device, a terminal device unit, a terminal device station, a mobile station, a mobile, a remote station, a remote site, a remote terminal device, a subscriber unit, a subscriber station, a user agent, a terminal device apparatus, or the like. As an example, in this embodiment of this disclosure, a terminal device shown in FIG. 1 is a mobile phone.

Figure 2:
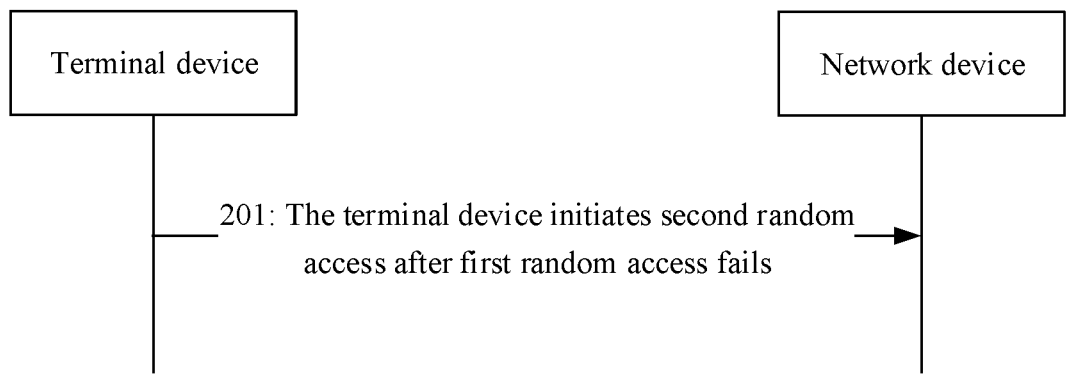
FIG. 2 is a schematic flowchart of a random access method according to an embodiment of this disclosure.

FIG. 2 is a schematic flowchart of a random access method according to an embodiment of this disclosure. As shown in FIG. 2, the random access method may include the following step 201.

Step 201: A terminal device initiates second random access after first random access fails.

In this embodiment of this disclosure, first uplink data in the first random access and second uplink data in the second random access are the same in data size, the first uplink data is uplink data corresponding to a first resource for the first random access, the second uplink data is uplink data corresponding to a second resource for the first random access, the first random access includes two-step random access or four-step random access, and the second random access includes two-step random access or four-step random access.

Optionally, in this embodiment of this disclosure, the second resource includes at least one of the following: a target third resource, or a PUSCH; and the target third resource includes at least one of the following: a PRACH preamble or a RO.

Optionally, in this embodiment of this disclosure, the initiating second random access includes:

Step 201*a*: The terminal device selects a target PRACH preamble set based on configuration information and the data size of the first uplink data; and Step 201*b*: The terminal device initiates second random access by using the second resource.

In this embodiment of this disclosure, the configuration information is predefined or is configured by a network device for the terminal device.

In an example, the following steps are included before the step 201*a*:

Step 201*c*: A network device transmits configuration information to the terminal device.

For example, the configuration information includes at least one of the following: a correspondence between M PRACH preamble sets and N third resources, or a correspondence between the N third resources and X PUSCHs.

One third resource includes at least one of the following: a PRACH preamble or a RO, one PRACH preamble set corresponds to at least one third resource, one PUSCH corresponds to at least one third resource, M is an integer greater than 1, and N and X are positive integers. For example, the terminal device may, based on the correspondence between M PRACH preamble sets and N third resources, and the correspondence between the N third resources and X PUSCHs, determine that: one PRACH preamble set corresponding to a PRACH has a pre-configured relationship with a PUSCH having a corresponding size, or one PRACH preamble set corresponding to a RO has a pre-configured relationship with a PUSCH having a corresponding size, or one PRACH preamble set corresponding to a combination of a PRACH and a RO has a pre-configured relationship with a PUSCH having a corresponding size. one PRACH preamble set is a preamble group.

For example, in a case that the second random access is two-step random access, based on a data size of first uplink data, the terminal device selects, from X PUSCHs, PUSCHs having a data size that is the same as the data size of the first uplink data, and then selects one PRACH preamble set as a target PRACH preamble set from PRACH preamble sets corresponding to these PUSCHs.

For example, a target third resource in the second resource is at least one third resource corresponding to the target PRACH preamble set, which means that after selecting a target PRACH preamble set, the terminal device may select a target third resource from all third resources corresponding to the target PRACH preamble set.

In an example, if the configuration information is not configured in the terminal device and a previous random access (that is, the first random access) is 2-step RACH access, the terminal device re-initiates 2-step RACH access (that is, the second random access) for the same RACH procedure. In this case, a data size of the selected PUSCH (that is, the PUSCH contained in the transmitted MsgA) should be the same as the data size of the PUSCH (that is, the PUSCH contained in the MsgA) in the previous random access.

In another example, the foregoing X PUSCHs have a same data size, which means that corresponding PUSCHs in 2-step RACH are pre-configured to have exactly the same data size.

Optionally, in this embodiment of this disclosure, in a case that the first random access is two-step random access, the first uplink data is a first PUSCH, or in a case that the first random access is four-step random access, the first uplink data is data carried by first uplink grant information; and in a case that the second random access is two-step random access, the second uplink data is a second PUSCH, or in a case that the second random access is four-step random access, the second uplink data is data carried by second uplink grant information.

Further, optionally, in this embodiment of this disclosure, in a case that the first random access is two-step random access, and the second random access is four-step random access, if fallback from two-step random access directly to four-step random access is triggered, a payload size of the first PUSCH is the same as a size of data carried by the second uplink grant information.

Scenario 1: In a case that both the first random access and the second random access are two-step random access, the first uplink data is the first PUSCH, and the second uplink data is the second PUSCH.

For example, in the scenario in which both the previous random access and the next random access are 2-step RACH, the terminal device re-initiates 2-step RACH access for the same RACH procedure after the previous 2-step RACH access fails. In this case, the Preamble group (for example, group A or group B) corresponding to the selected target resource (that is, any one of a Preamble, a RO, a combination of a Preamble and a RO) should be the same as the Preamble group corresponding to the previous 2-step RACH access, which means that the sizes of the PUSCH resources corresponding to the two times of random access should be the same.

Scenario 2: In a case that the first random access is two-step random access and the second random access is four-step random access, the first uplink data is a second PUSCH, and the second uplink data is data carried by the first uplink grant information.

For example, in a case that the previous random access is 2-step RACH and the next random access is 4-step RACH, the network side broadcasts and configures a relationship between a preamble/RO and a PUSCH resource in the 2-step RACH, and broadcasts and configures a preamble group AB in the 4-step RACH. After the previous 2-step RACH access fails, the terminal device re-initiates the 4-step RACH access for the same RACH procedure. In this case, an uplink grant size corresponding to a Preamble group (for example, group A or group B) that corresponds to the newly selected target resource (because the current random access is 4-step RACH, the target resource is a Preamble) should be consistent with a size of a PUSCH resource for the MsgA transmitted in the previous 2-step RACH access.

Scenario 3: In a case that the first random access is four-step random access and the second random access is two-step random access, the first uplink data is data carried by the second uplink grant information, and the second uplink data is the first PUSCH.

For example, in a case that the previous random access is 4-step RACH and the next random access in the scenario is 2-step RACH, the terminal device re-initiates the 2-step RACH access for the same RACH procedure after the previous 4-step RACH access fails. In this case, an uplink grant size (that is, a PUSCH size) corresponding to a Preamble group (for example, group A or group B) that corresponds to the newly selected target resource (that is, a Preamble, a RO, and a combination of a Preamble and a RO) should be consistent with an uplink grant size contained in a Preamble group of the previous 4-step RACH.

Scenario 4: a further sub scenario of the scenario 3. In a case that the first random access is two-step random access, and the second random access is four-step random access, if fallback from two-step random access directly to four-step random access is triggered, a payload size of the first PUSCH is the same as a size of data carried by the second uplink grant information.

For example, in a scenario in which the 2-step RACH procedure directly falls back to the 4-step RACH procedure, the UE initiates a direct fallback from the MsgB of the 2-step RACH access to the Msg3 of the 4-step RACH access to continue transmission, then the UL grant size carried in the RAR by the network device should be the same as the payload size of the PUSCH corresponding to a Preamble group that corresponds to the used resource.

In the random access method according to the embodiments of this disclosure, after the first random access fails, in order to prevent the terminal device from performing a new encapsulation process, when the second random access is initiated by the terminal device, a data size of uplink data corresponding to the second resource used for the second random access is the same as a data size of uplink data corresponding to the first source used for the first random access. In this way, the same data size is kept for uplink data corresponding to resources selected for a previous random access and that for the next random access, ensuring that the second random access succeeds, and improving communication efficiency and efficacy.

Figure 3:
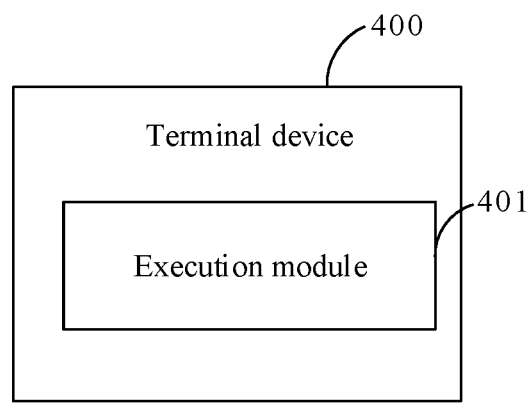
FIG. 3 is a first schematic structural diagram of a terminal device according to an embodiment of this disclosure.

FIG. 3 is a possible schematic structural diagram of a terminal device provided for implementation of the embodiments of this disclosure. As shown in FIG. 3, the terminal device 400 includes an execution module 401.

The execution module 401 is configured to initiate second random access after first random access fails, where first uplink data in the first random access and second uplink data in the second random access are the same in data size, the first uplink data is uplink data corresponding to a first resource for the first random access, the second uplink data is uplink data corresponding to a second resource for the first random access, the first random access includes two-step random access or four-step random access, and the second random access includes two-step random access or four-step random access.

Optionally, the second resource includes at least one of the following: a target third resource, or a target random access PUSCH; and the target third resource includes at least one of the following: a PRACH preamble or a RO.

Optionally, the execution module 401 is specifically configured to: select a target PRACH preamble set based on configuration information and the data size of the first uplink data; and initiate second random access by using the second resource. The configuration information includes at least one of the following: a correspondence between M PRACH preamble sets and N third resources, or a correspondence between the N third resources and X PUSCHs; and one third resource includes at least one of the following: a PRACH preamble or a RO, one PRACH preamble set corresponds to at least one third resource, one PUSCH corresponds to at least one third resource, the target third resource is at least one third resource corresponding to a target PRACH preamble set, M is an integer greater than 1, and N and X are positive integers.

Optionally, the X PUSCHs all have a same data size.

Optionally, the configuration information is predefined or is configured by a network device for the terminal device.

Optionally, in a case that the first random access is two-step random access, the first uplink data is a first PUSCH, or in a case that the first random access is four-step random access, the first uplink data is data carried by first uplink grant information; and in a case that the second random access is two-step random access, the second uplink data is a second PUSCH, or in a case that the second random access is four-step random access, the second uplink data is data carried by second uplink grant information.

Optionally, in a case that the first random access is two-step random access, and the second random access is four-step random access, if fallback from two-step random access directly to four-step random access is triggered, a payload size of the first PUSCH is the same as a size of data carried by the second uplink grant information.

Optionally, the first random access failure includes at least one of the following: the first random access is not completed, the first random access is not successfully completed, or the first random access is problematic.

In the terminal device according to this embodiment of this disclosure, after the first random access fails, in order to prevent the terminal device from performing a new encapsulation process, when the second random access is initiated by the terminal device, a data size of uplink data corresponding to the second resource used for the second random access is the same as a data size of uplink data corresponding to the first source used for the first random access. In this way, the same data size is kept for uplink data corresponding to resources selected for a previous random access and that for the next random access, ensuring that the second random access succeeds, and improving communication efficiency and efficacy.

The terminal device provided in this embodiment of this disclosure can implement the processes shown in the foregoing method embodiment. To avoid repetition, details are not described herein again.

Figure 4:
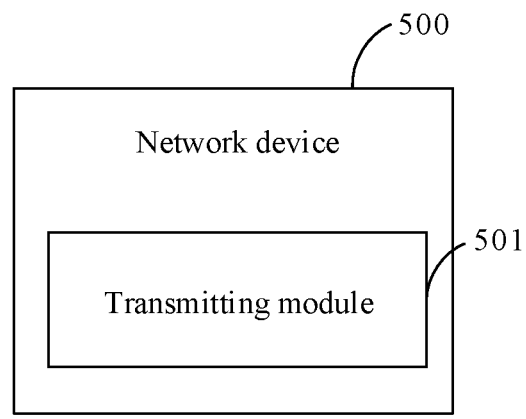
FIG. 4 is a first schematic structural diagram of a network device according to an embodiment of this disclosure.

FIG. 4 is a possible schematic structural diagram of a network device according to an embodiment of this disclosure. As shown in FIG. 4, the network device 500 includes a transmitting module 501.

The transmitting module 501 is configured to transmit configuration information to a terminal device.

The configuration information includes at least one of the following: a correspondence between M PRACH preamble sets and N third resources, or a correspondence between the N third resources and X PUSCHs; and one third resource includes at least one of the following: a PRACH preamble or a RO, one PRACH preamble set corresponds to at least one third resource, one PUSCH corresponds to at least one third resource, M is an integer greater than 1, and N and X are positive integers.

Optionally, the X PUSCHs all have a same data size.

The network device according to this embodiment of this disclosure transmits configuration information to the terminal device, so that the terminal device may select a target PRACH preamble set based on the configuration information and the data size of the first uplink data, and determine a second resource based on the target PRACH preamble set to initiate second random access. A data size of uplink data corresponding to the second resource used for the second random access is the same as a data size of uplink data corresponding to the first source used for the first random access. In this way, the same data size is kept for uplink data corresponding to resources selected for a previous random access and that for the next random access, ensuring that the second random access succeeds, and improving communication efficiency and efficacy.

The network device provided in this embodiment of this application can implement the processes shown in the foregoing method embodiment. To avoid repetition, details are not described herein again.

Figure 5:
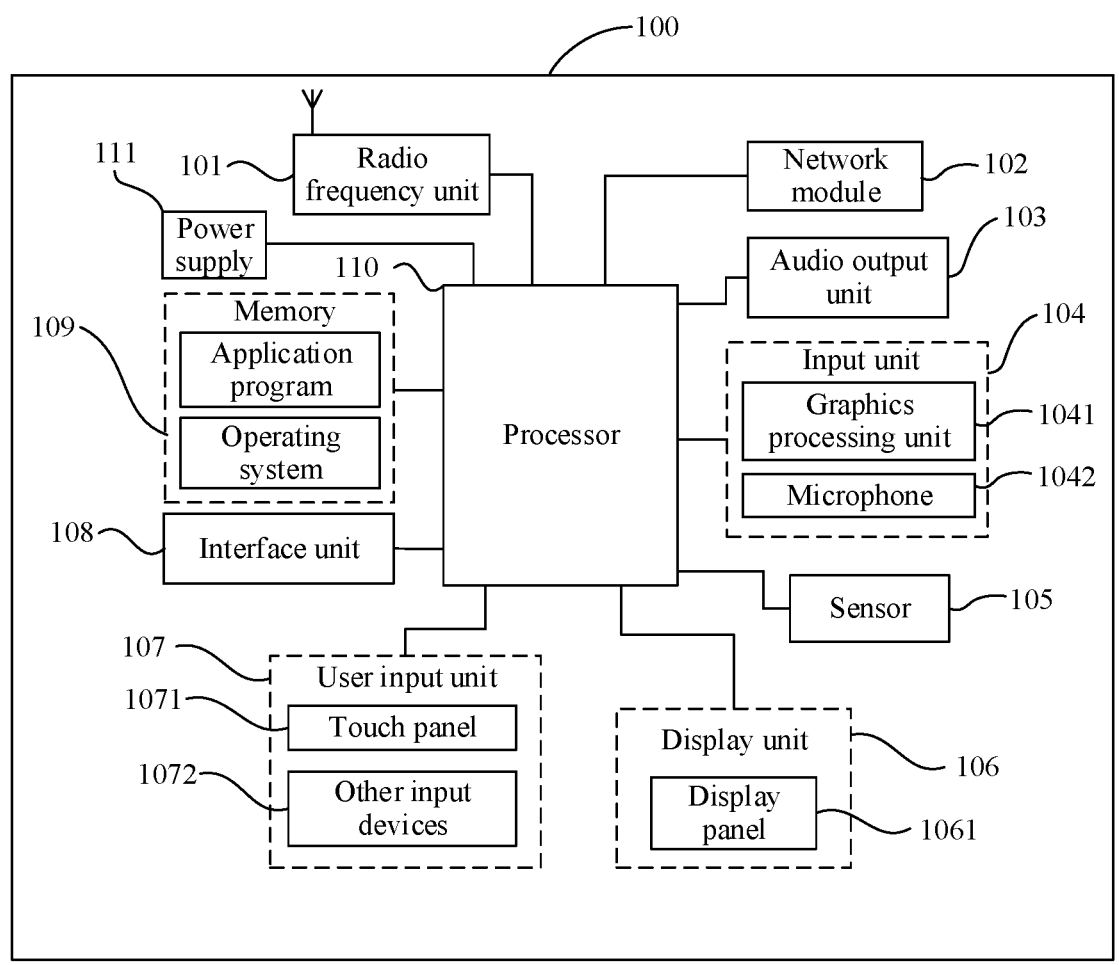
FIG. 5 is a second schematic structural diagram of a terminal device according to an embodiment of this disclosure.

FIG. 5 is a schematic diagram of a hardware structure of a terminal device for implementing the embodiments of this disclosure. The terminal device 100 includes but is not limited to components such as a radio frequency unit 101, a network module 102, an audio output unit 103, an input unit 104, a sensor 105, a display unit 106, a user input unit 107, a screen unit 108, a memory 109, a processor 110, and a power supply 111. A person skilled in the art can understand that the structure of the terminal device 100 shown in FIG. 5 does not constitute any limitation on the terminal device. The terminal device 100 may include more or fewer components than those shown in the figure, or a combination of some components, or the components disposed differently. In this embodiment of this disclosure, the terminal device 100 includes but is not limited to a mobile phone, a tablet computer, a laptop computer, a palmtop computer, an in-vehicle terminal device, a wearable device, a pedometer, and the like.

The processor 110 is configured to initiate second random access after first random access fails, where first uplink data in the first random access and second uplink data in the second random access are the same in data size, the first uplink data is uplink data corresponding to a first resource for the first random access, the second uplink data is uplink data corresponding to a second resource for the first random access, the first random access includes two-step random access or four-step random access, and the second random access includes two-step random access or four-step random access.

It should be noted that for implementation of the functional modules in FIG. 5, reference is made to all related content involved in the foregoing method embodiments. Details are not described herein again.

In the terminal device according to this embodiment of this disclosure, after the first random access fails, in order to prevent the terminal device from performing a new encapsulation process, when the second random access is initiated by the terminal device, a data size of uplink data corresponding to the second resource used for the second random access is the same as a data size of uplink data corresponding to the first source used for the first random access. In this way, the same data size is kept for uplink data corresponding to resources selected for a previous random access and that for the next random access, ensuring that the second random access succeeds, and improving communication efficiency and efficacy.

It should be understood that, in this embodiment of this disclosure, the radio frequency unit 101 may be configured to transmit or receive a signal in an information transmitting/receiving or call process. Specifically, the radio frequency unit 101 receives downlink data from a base station and transmits the downlink data to the processor 110 for processing; and transmits uplink data to the base station. Typically, the radio frequency unit 101 includes but is not limited to an antenna, at least one amplifier, a transceiver, a coupler, a low noise amplifier, a duplexer, and the like. In addition, the radio frequency unit 101 may also communicate with a network and other devices via a wireless communications system.

The terminal device 100 provides a user with wireless broadband internet access through the network module 102, for example, helping the user to send or receive an email, to browse a web page, or to access streaming media.

The audio output unit 103 may convert audio data received by the radio frequency unit 101 or the network module 102 or stored in the memory 109 into an audio signal, and output the audio signal as a sound. In addition, the audio output unit 103 may further provide audio output (for example, a call signal received sound or a message received sound) related to a specific function performed by the terminal device 100. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042. The graphics processing unit 1041 processes image data of a static picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium) or sent by the radio frequency unit 101 or the network module 102. The microphone 1042 can receive a sound and can process the sound into audio data. The processed audio data can be converted in a telephone call mode into a format that can be sent to a mobile communication base station through the radio frequency unit 101, for outputting.

The terminal device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a motion sensor, an accelerometer sensor may detect for a value of an acceleration in various directions (there are usually three axes), may detect for a value and a direction of gravity when the terminal is static, and may be configured to recognize a posture of the terminal device (for example, landscape/portrait mode switching, a related game, or magnetometer posture calibration), provide a function related to vibration recognition (for example, a pedometer or a keystroke), or the like. The sensor 105 may further include a fingerprint sensor, a pressure sensor, an iris sensor, a molecular sensor, a gyroscope, a barometer, a hygrometer, a thermometer, or an infrared sensor. Details are not described herein again.

The display unit 106 is configured to display information entered by the user or information provided for the user. The display unit 106 may include the display panel 1061. The display panel 1061 may be configured in a form of a liquid crystal display (LCD), an organic light-emitting diode (OLED), or the like.

The user input unit 107 may be configured to receive entered numerical or character information, and generate key signal input that is related to user setting and function control of the terminal device 100. Specifically, the user input unit 107 may include a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch location by the user, detects a signal brought by the touch operation, and transmits the signal to the touch controller. The touch controller receives touch information from the touch detection apparatus, converts the touch information into point coordinates, transmits the point coordinates to the processor 110, receives a command transmitted by the processor 110, and executes the command. In addition, the touch panel 1071 may be implemented in a plurality of forms, for example, as a resistive, capacitive, infrared, or surface acoustic wave touch panel. The user input unit 107 may further include other input devices 1072 in addition to the touch panel 1071. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. Although in FIG. 5, the touch panel 1071 and the display panel 1061 act as two independent parts to implement input and output functions of the terminal device 100, in some embodiments, the touch panel 1071 and the display panel 1061 may be integrated to implement the input and output functions of the terminal device 100. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive an input (for example, data information or power) from an external apparatus and transmit the received input to one or more elements within the terminal 100, or may be configured to transmit data between the terminal device 100 and the external apparatus.

The memory 109 may be configured to store software programs and various data. The memory 109 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 109 may include a high-speed random access memory, or may include a non-volatile memory, for example, at least one magnetic disk storage device, a flash memory device, or other volatile solid-state storage devices.

The processor 110 is a control center of the terminal device 100, uses various interfaces and lines to connect all parts of the entire terminal device 100, and performs various functions and data processing of the terminal device 100 by running or executing the software program and/or module stored in the memory 109 and invoking data stored in the memory 109, thereby performing overall monitoring on the terminal device 100. The processor 110 may include one or more processing units. Optionally, an application processor and a modem processor may be integrated in the processor 110. The application processor primarily processes an operating system, user interfaces, application programs, and the like. The modem processor primarily processes radio communication. It may be understood that the modem processor may alternatively not be integrated into the processor 110.

The terminal device 100 may further include a power supply 111 (for example, a battery) that supplies power to each component. Optionally, the power supply 111 may be logically connected to the processor 110 by using a power management system, so as to implement functions such as charging management, discharging management, and power consumption management by using the power management system.

In addition, the terminal device 100 includes some functional modules that are not shown. Details are not described herein again.

Figure 6:
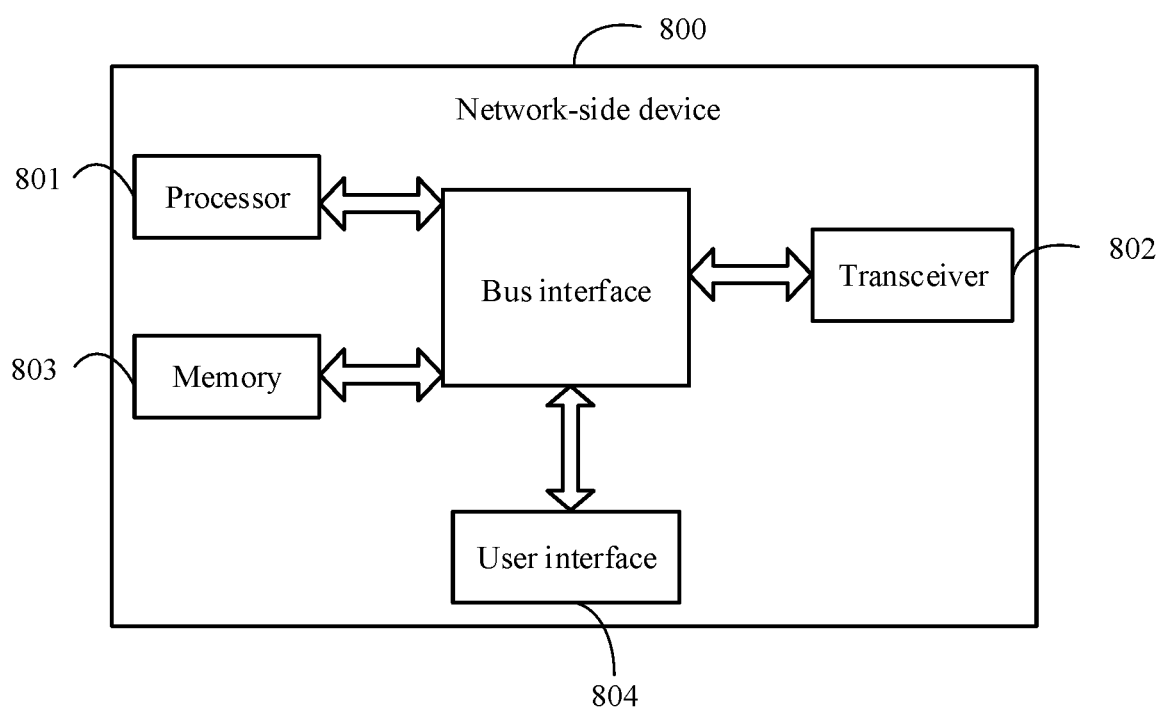
FIG. 6 is a second schematic structural diagram of a network device according to an embodiment of this disclosure.

FIG. 6 is a schematic diagram of a hardware structure of a network device for implementing an embodiment of this disclosure. The network device 800 includes a processor 801, a transceiver 802, a memory 803, a user interface 804, and a bus interface.

The transceiver 802 is used as the transmitting module 501, and configured to transmit configuration information to a terminal device.

The configuration information includes at least one of the following: a correspondence between M PRACH preamble sets and N third resources, or a correspondence between the N third resources and X PUSCHs; and one third resource includes at least one of the following: a PRACH preamble or a RO, one PRACH preamble set corresponds to at least one third resource, one PUSCH corresponds to at least one third resource, M is an integer greater than 1, and N and X are positive integers.

The network device according to this embodiment of this disclosure transmits configuration information to the terminal device, so that the terminal device may select a target PRACH preamble set based on the configuration information and the data size of the first uplink data, and determine a second resource based on the target PRACH preamble set to initiate second random access. A data size of uplink data corresponding to the second resource used for the second random access is the same as a data size of uplink data corresponding to the first source used for the first random access. In this way, the same data size is kept for uplink data corresponding to resources selected for a previous random access and that for the next random access, ensuring that the second random access succeeds, and improving communication efficiency and efficacy.

In this embodiment of this disclosure, in FIG. 6, a bus architecture may include any quantity of interconnected buses and bridges, and specifically connects together circuits that are of one or more processors represented by the processor 801 and of a memory represented by the memory 803. The bus architecture may further interconnect various other circuits such as a peripheral device, a voltage regulator, and a power management circuit. These are all well known in the art, and therefore are not further described in this specification. The bus interface provides interfaces. The transceiver 802 may be a plurality of components, including a transmitter and a receiver, and provides units for communicating with a variety of other apparatuses on a transmission medium. For different user equipment, the user interface 804 may also be an interface capable of externally or internally connecting a required device, and the connected device includes but is not limited to a keypad, a display, a speaker, a microphone, a joystick, and the like. The processor 801 is responsible for management of the bus architecture and general processing, and the memory 803 may store data used by the processor 801 when the processor 801 performs an operation.

In addition, the network device 800 includes some functional modules that are not shown. Details are not described herein.

Optionally, an embodiment of this disclosure further provides a terminal device, including a processor, a memory, and a computer program stored in the memory and capable of running on the processor. When the computer program is executed by the processor, the processes of the random access method in the foregoing embodiments are implemented, with the same technical effects achieved. To avoid repetition, details are not described herein again.

Optionally, an embodiment of this disclosure further provides a network device, including a processor, a memory, and a computer program stored in the memory and capable of running on the processor. When the computer program is executed by the processor, the processes of the random access method in the foregoing embodiments are implemented, with the same technical effects achieved. To avoid repetition, details are not described herein again.

An embodiment of this disclosure further provides a computer-readable storage medium, where a computer program is stored in the computer-readable storage medium. When the computer program is executed by a processor, a plurality of processes of the random access method in the foregoing embodiments are implemented. To avoid repetition, details are not described herein again. For example, the computer-readable storage medium includes a read-only memory (ROM), a random access memory (RAM), a magnetic disk, an optical disc, or the like.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of the embodiments of this disclosure essentially, or a part contributing to the prior art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, a person of ordinary skill in the art may develop many other forms without departing from principles of this disclosure and the protection scope of the claims, and all such forms shall fall within the protection scope of this disclosure.

What is claimed is:

1. A random access method, applied to a terminal device, wherein the method comprises:
    initiating second random access after first random access fails, wherein
    first uplink data in the first random access and second uplink data in the second random access are the same in data size, the first uplink data is uplink data corresponding to a first resource for the first random access, the second uplink data is uplink data corresponding to a second resource for the first random access, the first random access comprises two-step random access or four-step random access, and the second random access comprises two-step random access or four-step random access; wherein the uplink data is a payload carried by the PUSCH, or an uplink grant;
    wherein the second resource comprises at least one of the following: a target third resource, or a random access uplink data shared channel resource (PUSCH); and the target third resource comprises at least one of the following: a physical random access channel (PRACH) preamble or a random access occasion (RO);
    wherein the initiating second random access comprises:
    selecting a target PRACH preamble set based on configuration information and the data size of the first uplink data; and
    initiating the second random access by using the second resource; wherein
    the configuration information comprises at least one of the following: a correspondence between M PRACH preamble sets and N third resources, or a correspondence between the N third resources and X PUSCHs.

2. The method according to claim 1, wherein
    one third resource comprises at least one of the following: a PRACH preamble or a RO, one PRACH preamble set corresponds to at least one third resource, one PUSCH corresponds to at least one third resource, the target third resource is at least one third resource corresponding to the target PRACH preamble set, M is an integer greater than 1, and N and X are positive integers.

3. The method according to claim 2, wherein the X PUSCHs all have a same data size.

4. The method according to claim 2, wherein the configuration information is predefined or is configured by a network device for the terminal device.

5. The method according to claim 1, wherein
    in a case that the first random access is two-step random access, the first uplink data is a payload carried by a first PUSCH, or in a case that the first random access is four-step random access, the first uplink data is a first uplink grant; and
    in a case that the second random access is two-step random access, the second uplink data is a payload carried by a second PUSCH, or in a case that the second random access is four-step random access, the second uplink data is a second uplink grant.

6. The method according to claim 5, wherein in a case that the first random access is two-step random access, and the second random access is four-step random access, if fallback from two-step random access directly to four-step random access is triggered, a size of the payload carried by the first PUSCH is the same as a size of the second uplink grant.

7. The method according to claim 1, wherein the first random access failure comprises at least one of the following: the first random access is not completed, the first random access is not successfully completed, or the first random access is problematic.

8. A terminal device, comprising a processor, a memory, and a computer program stored in the memory and capable of running on the processor, wherein the computer program is executed by the processor to implement:
    initiating second random access after first random access fails, wherein
    first uplink data in the first random access and second uplink data in the second random access are the same in data size, the first uplink data is uplink data corresponding to a first resource for the first random access, the second uplink data is uplink data corresponding to a second resource for the first random access, the first random access comprises two-step random access or four-step random access, and the second random access comprises two-step random access or four-step random access; wherein the uplink data is a payload carried by the PUSCH, or an uplink grant;
    wherein the second resource comprises at least one of the following: a target third resource, or a random access uplink data shared channel resource (PUSCH); and the target third resource comprises at least one of the following: a physical random access channel (PRACH) preamble or a random access occasion (RO);
    wherein the initiating second random access comprises:
    selecting a target PRACH preamble set based on configuration information and the data size of the first uplink data; and
    initiating the second random access by using the second resource; wherein
    the configuration information comprises at least one of the following: a correspondence between M PRACH preamble sets and N third resources, or a correspondence between the N third resources and X PUSCHs.

9. The terminal device according to claim 8, wherein
    one third resource comprises at least one of the following: a PRACH preamble or a RO, one PRACH preamble set corresponds to at least one third resource, one PUSCH corresponds to at least one third resource, the target third resource is at least one third resource corresponding to the target PRACH preamble set, M is an integer greater than 1, and N and X are positive integers.

10. The terminal device according to claim 9, wherein the X PUSCHs all have a same data size.

11. The terminal device according to claim 9, wherein the configuration information is predefined or is configured by a network device for the terminal device.

12. The terminal device according to claim 8, wherein in a case that the first random access is two-step random access, the first uplink data is a payload carried by a first PUSCH, or in a case that the first random access is four-step random access, the first uplink data is a first uplink grant; and
    in a case that the second random access is two-step random access, the second uplink data is a payload carried by a second PUSCH, or in a case that the second random access is four-step random access, the second uplink data is a second uplink grant.

13. The terminal device according to claim 12, wherein in a case that the first random access is two-step random access, and the second random access is four-step random access, if fallback from two-step random access directly to four-step random access is triggered, a size of the payload carried by the first PUSCH is the same as a size of the second uplink grant.

14. The terminal device according to claim 8, wherein the first random access failure comprises at least one of the following: the first random access is not completed, the first random access is not successfully completed, or the first random access is problematic.

15. A non-transitory computer readable storage medium, wherein the non-transitory computer readable storage medium stores a computer program, and when the computer program is executed by a processor, the steps of the random-access method according to claim 1 are implemented.

\* \* \* \* \*